US009487595B2

(12) United States Patent
Kawai et al.

(10) Patent No.: US 9,487,595 B2
(45) Date of Patent: Nov. 8, 2016

(54) METHOD FOR PRODUCING POROUS CELLULOSE BEADS

(75) Inventors: Yoshikazu Kawai, Takasago (JP); Yasuyuki Suzuki, Takasago (JP); Kenichiro Morio, Takasago (JP); Masaru Hirano, Takasago (JP)

(73) Assignee: KANEKA CORPORATION, Osaka (JP)

( * ) Notice: Subject to any disclaimer, the term of this patent is extended or adjusted under 35 U.S.C. 154(b) by 293 days.

(21) Appl. No.: 14/001,807

(22) PCT Filed: Mar. 6, 2012

(86) PCT No.: PCT/JP2012/055710
§ 371 (c)(1),
(2), (4) Date: Aug. 27, 2013

(87) PCT Pub. No.: WO2012/121258
PCT Pub. Date: Sep. 13, 2012

(65) Prior Publication Data
US 2013/0331563 A1 Dec. 12, 2013

(30) Foreign Application Priority Data
Mar. 8, 2011 (JP) ................................. 2011-050714

(51) Int. Cl.
C08B 15/00 (2006.01)
C08B 15/10 (2006.01)
C08L 1/02 (2006.01)
B01J 20/26 (2006.01)
B01J 20/285 (2006.01)
B01J 20/30 (2006.01)
B01J 20/28 (2006.01)
C08J 9/28 (2006.01)

(52) U.S. Cl.
CPC .............. *C08B 15/10* (2013.01); *B01J 20/267* (2013.01); *B01J 20/285* (2013.01); *B01J 20/28078* (2013.01); *B01J 20/3085* (2013.01); *C08B 15/00* (2013.01); *C08J 9/28* (2013.01); *C08L 1/02* (2013.01); *C08J 2201/0546* (2013.01); *C08J 2301/02* (2013.01)

(58) Field of Classification Search
CPC ....... C08L 1/02; B01J 20/267; B01J 20/285; B01J 20/3085; B01J 20/28078; C08B 15/00; C08B 15/10; C08J 2301/02; C08J 2201/0546
USPC .............................................. 536/56; 514/57
See application file for complete search history.

(56) References Cited

U.S. PATENT DOCUMENTS

| 2,519,249 A * | 8/1950 | Hutchinson ............ C08B 11/12 536/97 |
| 4,634,470 A | 1/1987 | Kamide et al. |
| 5,410,034 A | 4/1995 | Isogai et al. |
| 6,599,620 B2 | 7/2003 | Fujita et al. |
| 7,763,348 B2 | 7/2010 | Fujita et al. |
| 7,850,858 B2 | 12/2010 | Kobayashi et al. |
| 2003/0012941 A1 | 1/2003 | Fujita et al. |
| 2003/0186041 A1 | 10/2003 | Fujita et al. |
| 2008/0021365 A1 | 1/2008 | Kobayashi et al. |
| 2008/0070027 A1 | 3/2008 | Fujita et al. |
| 2009/0062118 A1* | 3/2009 | Umeda et al. ................ 502/404 |

FOREIGN PATENT DOCUMENTS

| JP | H09-124702 A | 5/1997 |
| JP | 11-158202 A | 6/1999 |
| JP | 2008-279366 A | 11/2008 |
| JP | 2009-014377 A | 1/2009 |
| JP | 2009-242770 A | 10/2009 |
| JP | 2010-236975 A | 10/2010 |
| JP | 2011-231152 A | 11/2011 |
| WO | WO 9830620 A1 * | 7/1998 |
| WO | WO-2006/025371 A1 | 3/2006 |

OTHER PUBLICATIONS

Fujita et al.; WO 9830620 A1; Jul. 16, 1998 (Machine English Translation).*
Wu et al., "Polymeric Materials Processing Technology: Section Three—Preparation of Alkali Cellulose", Jul. 2000.
Hershko et al., "Removal of Pathogenic Autoantibodies by Immunoadsorption", Ann. N.Y. Acad. Sci. 1051: 635-646 (2005).
Staudt et al., "Immunoadsorption in Dilated Cardiomyopathy: 6-month Results from a Randonmized Study", American Heart Journal, vol. 152, No. 4: 712.e1-712.e6 (2006).
Kuga, "New Cellulose Gel for Chromatography", Journal of Chromatography, 195 (1980) 221-230.
Du et al., "Preparation and Characterization of Novel Macroporous Cellulose Beads Regenerated from Ionic Liquid for Fast Chromatography", Journal of Chromatography A, 1217 (2010) 1298-1304.
Extended European Search Report issued Jul. 21, 2014 in EP Application No. 12754262.9.

* cited by examiner

Primary Examiner — Shaojia Anna Jiang
Assistant Examiner — Michael C Henry
(74) Attorney, Agent, or Firm — Polsinelli PC

(57) ABSTRACT

The objective of the present invention is to provide a convenient method for producing porous cellulose beads having high mechanical strength without using an auxiliary material which is highly toxic and corrosive and without a cumbersome and industrially adverse step. The method for producing porous cellulose beads according to the present invention is characterized in comprising the steps of mixing a cold alkaline aqueous solution and cellulose to prepare a cellulose dispersion and bringing the cellulose dispersion into contact with a coagulating solvent.

17 Claims, 1 Drawing Sheet

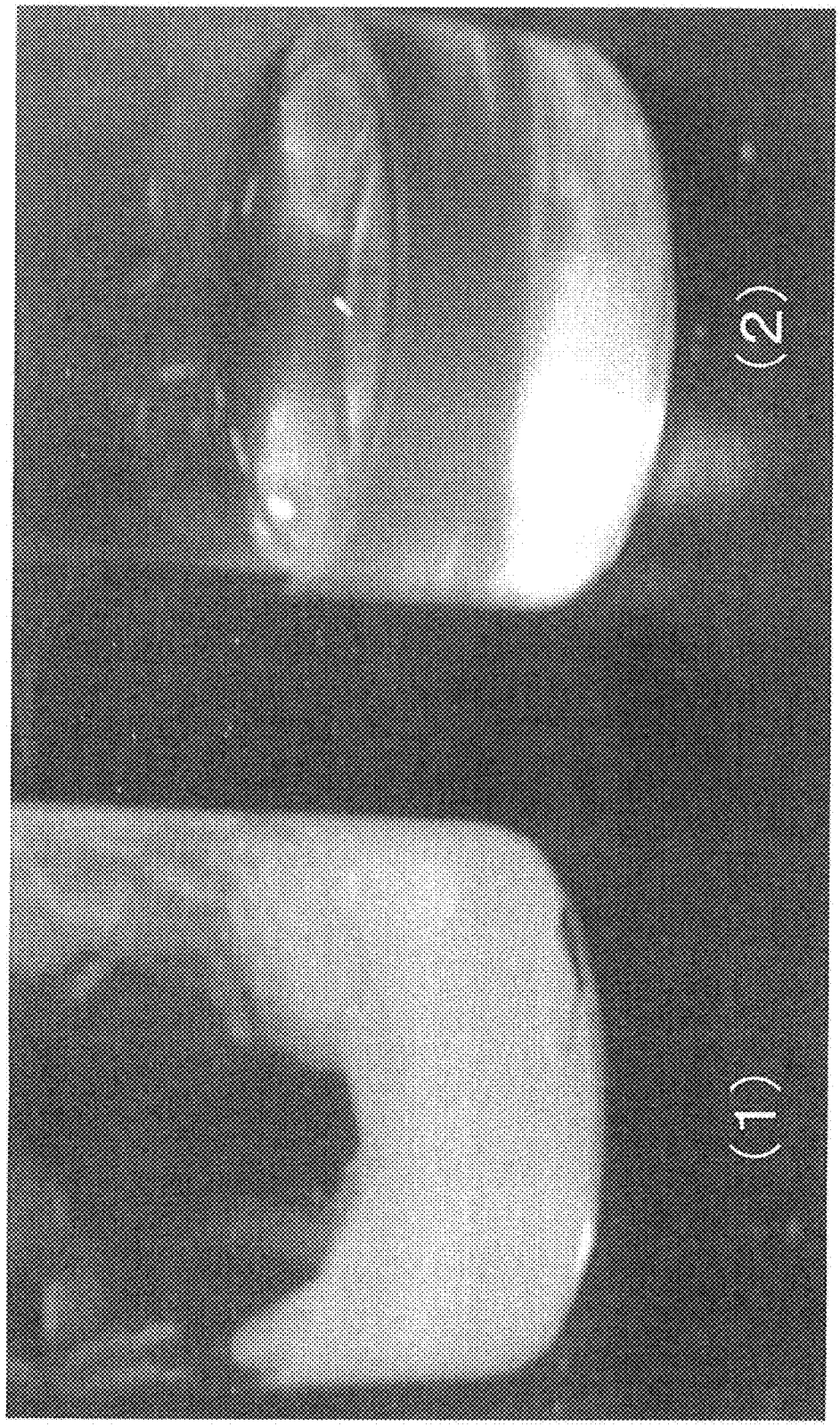

METHOD FOR PRODUCING POROUS CELLULOSE BEADS

CROSS REFERENCE TO RELATED APPLICATIONS

This application is a National Phase filing under 35 U.S.C. §371 of PCT/JP2012/055710 filed on Mar. 6, 2012; and this application claims priority to Application No. 2011-050714 filed in Japan on Mar. 8, 2011, under 35 U.S.C. §119; the entire contents of all are hereby incorporated by reference.

TECHNICAL FIELD

The present invention relates to a method for producing porous cellulose beads.

BACKGROUND ART

Porous cellulose beads are safer than other synthetic polymers and exhibits low non-specific adsorption property. In addition, though porous cellulose beads are classified as polysaccharide, the mechanical strength thereof is high. Furthermore, porous cellulose beads have a number of hydroxy groups, which can be used for introducing a ligand which interacts with a target substance to be adsorbed. Therefore, porous cellulose beads are used for various adsorbent. Such an adsorbent is exemplified by an adsorbent for various chromatographies and an affinity adsorbent. Specifically, an affinity adsorbent is used as a medical adsorbent and used for purifying an antibody medical drug, since a target substance can be efficiently purified and an unwanted substance concentration can be decreased by using the affinity adsorbent. In particular, an adsorbent which is obtained by immobilizing Protein A as an affinity ligand on a porous support is attracting attention as a therapeutic and medical adsorbent for arthritis, hemophilia and dilated cardiomyopathy (For example, Non-Patent Document 1 and Non-Patent Document 2). In addition, an adsorbent which is obtained by immobilizing Protein A as an affinity ligand on a porous support is also attracting attention as an adsorbent for purifying an antibody medical drug. The adsorbent can specifically adsorb and elute an immunoglobulin (IgG).

A method for producing such porous cellulose beads includes a cumbersome step in many cases as compared to the case of an ordinary synthetic polymer, since it is difficult to dissolve cellulose. As such a method, for example, Patent Document 1 discloses a method in which cellulose is dissolved in a solvent such as a calcium thiocyanate aqueous solution and then cellulose is coagulated. It is however difficult to construct facilities which are used for carrying out the method, since the above solvent is highly corrosive and toxic. In addition, it is well known that the cellulose solution used in the method exhibits a strange behavior and that the porous cellulose beads obtained by the method have considerably large pores (for example, Non-patent Document 3). Therefore, when the porous cellulose beads obtained by the method is used as an adsorbent for an antibody and the like, the adsorbent cannot be expected to show a high adsorptive performance, since the specific surface area of the porous cellulose beads is small. On the other hand, there is a method for producing a porous cellulose support by introducing substituents to improve a solubility of cellulose into hydroxy groups of cellulose, dissolving the cellulose in a general solvent, granulating the cellulose, and then removing the substituents (for example, Patent Document 2). However, the method has complicated steps, and a molecular weight of cellulose is decreased during the steps of introducing and removing the substituents. Therefore, the produced support is inclined not to have sufficient strength required for high speed process or large scale procedure, which is recently needed.

As a solvent which can easily dissolve cellulose, an ionic liquid is attracting attention. Non-Patent Document 4 discloses a method for obtaining cellulose beads by dissolving cellulose in an ionic liquid. However, an ionic liquid is not suited for being used as an auxiliary material in industrial level, since an ionic liquid is considerably expensive. In addition, with respect to the safety of an ionic liquid, there is only a few toxicity data and the like thereof, though an ionic liquid may remain. In addition, when an ionic liquid is used for medical purpose or for producing an adsorbent to purify pharmaceutical compound, it is predictable that confirmation of the safety of an ionic liquid is considerably required since an ionic liquid would remain even in a slight amount.

In addition, for example, Patent Documents 3 and 4 disclose a method for dissolving cellulose into a cool sodium hydroxide aqueous solution only. However, in the method described in Patent Document 3, a mixture of cellulose and a hydrogen bond-cleaving solution is heated at 100 to 350° C. under increased pressure, and then the cellulose in the mixture is dissolved in an alkaline aqueous solution. Such a method is not suitable for an industrial production. The method described in Patent Document 4 requires the steps in which cellulose is dispersed in a strong basic solution and the dispersion is frozen and then the cellulose is dissolved.

Patent Document 5 discloses cellulose which can be dissolved in an alkaline solution. However, the cellulose is microfabricated to be microfiber so that the diameter of the microfiber is not more than 1 μm or not more than 500 nm. Such a microfabrication is not suitable for an industrial production.

More recently, Patent Document 6 discloses a method for producing cellulose beads. The method has a step in which cellulose derived from a microorganism is dissolved to obtain a solution in accordance with the method described in Patent Document 4 and the solution is frozen. However, the step is too cumbersome to be applied to an industrial production.

PRIOR ART

Patent Document

Patent Document 1: JP 2009-242770 T
Patent Document 2: WO 2006/025371
Patent Document 3: U.S. Pat. No. 4,634,470 B
Patent Document 4: U.S. Pat. No. 5,410,034 B
Patent Document 5: JP H9-124702 A
Patent Document 6: JP 2010-236975 A Non-Patent Document Non-Patent Document 1: Annals of the New York Academy of Sciences 2005. Vol. 1051 p. 635-646
Non-Patent Document 2: American Heart Journal Vol. 152, Number 4 2006
Non-Patent Document 3: Journal of Chromatography, 195 (1980) 221-230
Non-Patent Document 4: Journal of Chromatography A, 1217 (2010) 1298-1304

DISCLOSURE OF THE INVENTION

Problem to be Solved by the Invention

The objective of the present invention is to provide a convenient method for producing porous cellulose beads having high mechanical strength without using an auxiliary material which is highly toxic and corrosive and without a cumbersome and industrially adverse step.

Means for Solving the Problems

The present inventors have conducted intensive studies to solve the above problem. In detail, it was the first problem how to dissolve cellulose, which is difficult to be dissolved in a low toxic and inexpensive solvent, in a conventional production of porous cellulose beads. At first, the present inventors also researched the condition for dissolving cellulose in the above-described solvent without difficulty. However, the present inventor completed the present invention by finding that porous cellulose beads can be successfully produced even from a cellulose dispersion without using a cellulose solution.

The method for producing porous cellulose beads according to the present invention is characterized in comprising the steps of mixing a cold alkaline aqueous solution and cellulose to prepare a cellulose dispersion and bringing the cellulose dispersion into contact with a coagulating solvent.

An alkali concentration in the above alkaline aqueous solution is preferably not less than 5 wt % and not more than 15 wt %. When the alkali concentration is within the range, a dispersing and a swelling property of cellulose in the alkaline aqueous solution can be improved.

In the present invention method, it is preferred to use cellulose having a median particle diameter of not less than 10 μm and not more than 500 μm as a raw material. It may be possibly industrially-disadvantaged and increase the production cost to pulverize cellulose until a median particle diameter of the cellulose becomes less than 10 μm. On the other hand, when cellulose having a too large median particle diameter is used, a stable dispersion may not be possibly obtained; and as a result, porous cellulose beads may not be possibly produced in an efficient way. Therefore, the median particle diameter is preferably not more than 500 μm.

A cellulose concentration in the above cellulose dispersion is preferably not less than 1 wt % and not more than 10 wt %. The cellulose concentration of less than 1 wt % may be possibly industrially-disadvantaged, since an amount of a solvent to be removed may be increased. On the other hand, when the concentration is too high, it may possibly require too long time to produce a homogenous dispersion. Therefore, the concentration is preferably not more than 10 wt %.

It is preferred that the above coagulating solvent contains an alcohol, since an alcohol is inexpensive. In addition, when the coagulating solvent containing an alcohol is used, the porous cellulose beads may be effectively produced.

It is preferred that the above coagulating solvent is acidified. When the coagulating solvent is acidified, the cellulose dispersion which contains the alkaline aqueous solution can be neutralized. In addition, the present inventors found that when the coagulating solvent which is acidified is used, a pore size distribution of the obtained porous cellulose beads becomes narrower. Therefore, when such a narrower pore size distribution is desired, it is preferred to use the coagulating solvent which is acidified.

A temperature for preparing and preserving the above cellulose dispersion is preferably not less than −20° C. and not more than 10° C. When the temperature is not less than −20° C., freeze of the alkaline aqueous solution can be prevented. On the other hand, when the temperature is not more than 10° C., the cellulose dispersion can be efficiently produced and coloration of the cellulose dispersion can be prevented.

It is preferred that the above cellulose dispersion is dispersed in a continuous phase to obtain an emulsion, and then the emulsion is brought into contact with the coagulating solvent. When such an emulsion is prepared, the porous cellulose beads which have higher sphericity can be obtained more easily.

It is preferred that the above coagulating solvent has not less than 0.01 times and not more than 1 time as much volume as the emulsion. When the volume is within the range, the porous cellulose beads which have preferred pores and surface pores can be obtained more certainly.

A value of Pv at the time of preparing the emulsion is preferably not less than 0.1 kW/m$^3$, wherein the value of Pv represents power consumption per volume. When the value is not less than 0.1 kW/m$^3$, the porous cellulose beads which have higher sphericity and preferred pores can be obtained more certainly.

A value of Pv at the time of bringing the above cellulose dispersion into contact with the above coagulating solvent is not less than 0.1 kW/m$^3$, wherein the value of Pv represents power consumption per volume. When the value is not less than 0.1 kW/m$^3$, the porous cellulose beads which have higher sphericity and preferred pores can be obtained more certainly.

A time required for adding the coagulating solvent to the emulsion is not more than 150 seconds. When the time is not more than 150 seconds, strength of the obtained porous cellulose beads can be amazingly increased for some unaccountable reasons.

It is preferred that the above cellulose dispersion is prepared by preparing a preliminary dispersion from water and cellulose and mixing the preliminary dispersion with the alkaline aqueous solution. In such a case, it is prevented that cellulose is clumped and a time required for preparing the cellulose dispersion can be decreased.

It is preferred that a stirring operation in at least one step is carried out using a turbine blade. When a turbine blade, of which shearing force is great, is used as a stirring blade, the porous cellulose beads which have higher sphericity and preferred pores can be amazingly obtained more easily for some unaccountable reasons.

The method for producing crosslinked porous cellulose beads according to the present invention is characterized in comprising the step of crosslinking the porous cellulose beads obtained by the above-described method according to the present invention.

Effect of the Invention

According to the present invention, porous cellulose beads which have high mechanical strength can be easily produced without using an auxiliary material which is highly toxic and corrosive and without a cumbersome step which is not suitable for an industrial production.

BRIEF DESCRIPTION OF THE DRAWING

FIG. 1(1) is a photograph of a cellulose dispersion according to the present invention, and FIG. 1(2) is a photograph of a cellulose solution according to a conventional method.

MODE FOR CARRYING OUT THE INVENTION

The method for producing porous cellulose beads according to the present invention is characterized in comprising the steps of mixing a cold alkaline aqueous solution and cellulose to prepare a cellulose dispersion and bringing the cellulose dispersion into contact with a coagulating solvent.

The present inventors found that when a cellulose dispersion obtained by dispersing cellulose in a cold alkaline aqueous solution is brought into contact with a coagulating solvent at a temperature that the cellulose dispersion is not frozen, porous cellulose beads can be easily produced at low cost substantively without using a solvent and a solubilizing agent which are highly toxic and corrosive. In addition, it is well-known that when a cellulose powder having a normal size is added into a cold alkaline aqueous solution, a dispersion which is far from a clear solution is generally obtained. However, as a result of various researches, the present inventors surprisingly found that porous cellulose beads can be easily produced at low cost even from such a cellulose dispersion as a result of various researches. It is probable that even when cellulose is not dissolved in an alkaline aqueous solution, a special cluster is formed from water and an alkaline component at low temperature, cellulose is coordinated with the cluster to be swelled, and the cluster is absorbed in and replaced by a coagulating solvent; as a result, the cellulose is coagulated and becomes porous.

Hereinafter, each step of the present invention is described.

(1) Step for Preparing a Cellulose Dispersion

In the present invention, a cold alkaline aqueous solution and cellulose are mixed. A reaction in which cellulose is solvated by a cold alkaline aqueous solution is an exothermic reaction; therefore, when cellulose is added to an alkaline aqueous solution having high temperature, a dispersion which is homogenous and colorless cannot be obtained. Therefore, low temperature is maintained at the time of mixing cellulose with an alkaline aqueous solution.

In the present invention, the term "low temperature" means a temperature which is less than an ambient temperature. As long as the temperature is less than an ambient temperature, there is no big problem. A temperature of not less than −20° C. is preferred, since a temperature control system can be simple and running cost of a temperature control system can be lowered. In addition, a temperature of not more than 10° C. is preferred, coloration of the cellulose dispersion is decreased and a dispersibility and a swellablility of cellulose become higher. The temperature is more preferably not less than −10° C. and not more than 20° C. When the temperature is not less than −10° C., it can be prevented to freeze an alkaline aqueous solution. On the other hand, when the temperature is not more than 20° C., the cellulose dispersion can be effectively prepared and coloration of the cellulose dispersion can be decreased. The temperature is more preferably not less than −5° C., even more preferably not less than −2° C., particularly preferably not less than −1° C., and more preferably not more than 15° C., even more preferably not more than 9° C., even more preferably not more than 5° C., even more preferably not more than 4° C., even more preferably not more than 1° C. In addition, the temperature of not more than 9° C. is preferred, since sphericity of the obtained porous cellulose beads can become higher.

An alkali to be used is not particularly limited as long as an aqueous solution of the alkali shows alkalinity. As such an alkali, lithium hydroxide, sodium hydroxide and potassium hydroxide are preferred from the view point of ready availability, and sodium hydroxide is most preferred from the view point of price and product safety.

A concentration of the alkali in the alkaline aqueous solution is not particularly limited, and is preferably not less than 3 wt % and not more than 20 wt %. When the concentration of the alkaline is included in the range, dispersibility and swellability of cellulose in the alkaline aqueous solution is high. The concentration is more preferably not less than 5 wt % and not more than 15 wt %, even more preferably not less than 7 wt % and not more than 10 wt %, and most preferably not less than 8 wt % and not more than 10 wt %.

The kind of the cellulose to be used is not particularly limited. For example, in the present invention method, it is not necessary to use substituted cellulose such as cellulose which is substituted by a substituent for improving solubility, and common unsubstituted cellulose can be used as a raw material, since cellulose is not needed to be dissolved.

A molecular weight of cellulose is not particularly limited, but a polymerization degree of cellulose is preferably not more than 1000. When the polymerization degree is not more than 1000, dispersibility and swellability of cellulose become higher. In addition, the polymerization degree of not less than 10 is preferred, since mechanical strength of the obtained porous cellulose beads becomes higher. The polymerization degree is more preferably not less than 50 and not more than 500, even more preferably not less than 100 and not more than 400, particularly preferably not less than 200 and not more than 350, and most preferably not less than 250 and not more than 350.

A median particle diameter of the cellulose used in the present invention method is preferably not less than 10 μm and not more than 500 μm. It is not needed in the present invention method to dissolve cellulose and pulverize cellulose in a special method for improving solubility. In addition, when cellulose is excessively pulverized, the overall productivity is decreased. In other words, cellulose is conventionally pulverized finely by a special method such as blasting treatment and wet grinding for dissolving cellulose in a cold alkaline aqueous solution; however, the production cost is raised due to such a treatment. Therefore, the median particle diameter of a raw material cellulose is preferably not less than 10 μm. In addition, when the median particle diameter is not less than 10 μm, clumping is hardly caused in the cellulose dispersion. On the other hand, when cellulose of which median particle diameter is too large is used, a stable dispersion cannot be obtained and eventually porous cellulose beads may not be possibly produced in an effective way. Therefore, the median particle diameter is preferably not more than 500 μm. The median particle diameter is more preferably not less than 15 μm, even more preferably 20 μm, particularly preferably not less than 45 μm, and more preferably not more than 200 μm.

In addition, a dissolving pulp is exemplified as cellulose of which solubility is improved. A dissolving pulp may be actually used as a raw material for producing the cellulose dispersion used in the present invention; however, it is well-known that a dissolving pulp may be produced commonly by a method of which environmental load is heavy. Also, the present inventors know that nowadays dissolving pulp is very difficult to be obtained as a raw material for producing porous cellulose beads probably due to a structural problem of cellulose industries. According to the present invention, porous cellulose beads can be effectively produced without using a dissolving pulp. Therefore, generally and easily available cellulose is preferably used in the present invention for decreasing a total production cost and improving productivity.

A condition to mix an alkaline aqueous solution with cellulose is not particularly limited. For example, cellulose may be added into an alkaline aqueous solution, and an alkaline aqueous solution may be added to cellulose. It is preferred that an alkaline aqueous solution is preliminarily cooled down to a low temperature and then cellulose is added to the cooled alkaline aqueous solution.

Cellulose may be suspended in water before mixing with an alkaline aqueous solution. As a result, clumping of cellulose can be prevented, and a time required for preparing the cellulose dispersion can be reduced, and the cellulose dispersion which is more homogeneous can be readily obtained. A ratio of cellulose in the suspension can be arbitrarily controlled, and is exemplified by not less than 1 wt % and not more than 40 wt %.

It is also preferred that cellulose or a cellulose suspension is cooled down to a low temperature similarly to an alkaline aqueous solution before mixing with an alkaline aqueous solution. In such a case, a temperature of cellulose or a cellulose suspension may not be the same as a temperature of an alkaline aqueous solution.

It is preferred to stir an alkaline aqueous solution to which cellulose or a cellulose suspension is added, or a cellulose suspension to which an alkaline aqueous solution is added. A value of Pv, which represents a stirring power in such a case, is preferably not less than 0.01 kW/m$^3$ and not more than 100 kW/m$^3$. When the stirring power is not less than 0.01 kW/m$^3$, both can be efficiently mixed. In addition, when the stirring power is too high, it may be possibly difficult to be mixed in some cases. Therefore, the stirring power is preferably not more than 100 kW/m$^3$.

Also, the present inventors surprisingly found that when a cellulose suspension obtained by dispersing cellulose in water is cooled down to a low temperature and then an alkaline aqueous solution is added to the stirred suspension, a homogeneous cellulose dispersion can be instantaneously prepared. Such a method is preferably used. In such a case, it is more preferred that a temperature of the alkaline aqueous solution to be added is low. It is also preferred that the cellulose dispersion is maintained at a low temperature during both of preparation and preservation. The temperature can be the same as the above-described temperature of an alkaline aqueous solution.

A concentration of cellulose in the cellulose dispersion is preferably not less than 1 wt % and not more than 10 wt %. When the concentration is not less than 1 wt %, a mechanical strength of the obtained porous cellulose beads becomes higher. The concentration which is not more than 10 wt % is preferred, since a viscosity of the cellulose dispersion becomes lower and an amount of cellulose which is not be dispersed or swelled is reduced. The concentration is more preferably not less than 3 wt % and not more than 10 wt %, even more preferably not less than 4 wt % and not more than 8 wt %, particularly preferably not less than 5 wt % and not more than 7 wt %, and most preferably not less than 5 wt % and not more than 6 wt %. When the concentration of cellulose in the cellulose dispersion is calculated, cellulose which is not dispersed nor swelled and which is not homogeneously dispersed is not counted.

(2) Step for Preparing an Emulsion

The cellulose dispersion may be dispersed in a continuous phase to prepare an emulsion, and then the emulsion may be brought into contact with a coagulating solvent. A preparation of such an emulsion is optional. However, when the step is undergone, porous cellulose beads may be readily obtained from the cellulose dispersion of which cellulose amount to be contained is relatively large. In addition, porous cellulose beads of which mechanical strength is high may be readily obtained.

A continuous phase is not particularly limited, and a continuous phase of which compatibility with the cellulose dispersion is low is preferably used. For example, an edible oil such as medium chain fatty acid triglyceride (MCT); a natural oil such as palm oil, coconut oil and squalene; a higher alcohol such as isostearyl alcohol and oleyl alcohol; a higher ester such as 2-octyldodecanol; a lipophilic organic solvent such as dichlorobenzene can be used. In addition, an appropriate amount of surfactant may be added to a continuous phase. Such a surfactant is exemplified by a sorbitan fatty acid ester such as sorbitan laurate, sorbitan stearate, sorbitan oleate and sorbitan trioleate.

An amount of a continuous phase may be adjusted to sufficiently disperse droplets of a cellulose dispersion. For example, a ratio of the continuous phase may be not less than one time by mass relative to a cellulose dispersion. On the other hand, when an amount of a continuous phase is too much, an amount of waste liquid may be excessively increased. Therefore, the ratio is preferably not more than 10 times by mass. The ratio is more preferably not less than 2 times by mass, even more preferably not less than 4 times by mass, and more preferably not more than 8 times by mass, even more preferably not more than 7 times by mass, particularly preferably not more than 6 times by mass.

It is preferred to adjust a temperature during the dispersion as similar to a temperature of the cellulose dispersion. In other words, it is preferred that a temperature of a continuous phase, a temperature when a continuous phase and a cellulose dispersion are mixed and a temperature when a cellulose dispersion is dispersed in a continuous phase are adjusted to be cool similarly to a temperature of the alkaline aqueous solution.

It is usually preferred when an emulsion is prepared, a cellulose dispersion is added to a stirred continuous phase. A Pv value of a stirring power during preparation of the emulsion is preferably not less than 0.1 kW/m$^3$ and not more than 12 kW/m$^3$. When the stirring power is not less than 0.1 kW/m$^3$, good sphericity and porous property may be readily achieved. In addition, when the stirring power is too high, a flowability of the emulsion may be possibly difficult to be stable; therefore, the stirring power is preferably not more than 12 kW/m$^3$. The stirring power is more preferably not less than 1.1 kW/m$^3$, even more preferably not less than 3.1 kW/m$^3$, and particularly preferably not less than 5.5 kW/m$^3$.

(3) Step for Coagulation

Next, the cellulose dispersion is brought into contact with a coagulating solvent so that cellulose becomes porous.

A coagulating solvent used in the present invention is not particularly limited as long as when the cellulose dispersion is brought into contact with the solvent, cellulose beads can be obtained. Specifically, water and an alcohol solvent is preferred, since the solvents have high affinity with the alkaline aqueous solution, which is a good solvent of the cellulose dispersion. In particular, an alcohol solvent is preferred, since when the solvent is used, a pore size of cellulose beads can be micrified in comparison with the case of using water. In addition, an alcohol solvent is preferred, since when the solvent used, sphericity becomes high. A mixed solvent of water and an alcohol is more preferred, since when the mixed solvent is used, a pore size of cellulose beads can be arbitrarily adjusted by changing a mixing ratio. An alcohol used in the present invention is not particularly limited, and alcohol of which carbon number is not more than 6 is preferred since such an alcohol has high affinity with the alkaline aqueous solution. An alcohol of which carbon number is not more than 4 is more preferred, and methanol is most preferred. A coagulating solvent may be an alcohol aqueous solution.

It is also preferred that the coagulating solvent used in the present invention is acidified. When the coagulating solvent is acidified, the alkaline aqueous solution can be preferably neutralized. It is preferred that the alkaline aqueous solution is rapidly neutralized, since a chemical damage of the obtained cellulose beads can be reduced. In addition, the present inventors surprisingly found that when the coagulating solvent is acidified, pore size distribution of the obtained porous beads becomes narrower. Therefore, when such a pore diameter distribution property is desired, it is particularly preferred that the coagulating solvent is acidified. A reagent for acidification is not particularly limited, and an inorganic acid such as sulfuric acid and hydrochloric acid, an organic acid such as acetic acid, citric acid and tartaric acid, an acid having buffering action, such as phosphate and carbonate, and the like can be widely used. The pH of the coagulating solvent may be adjusted to less than 7.0 for acidifying the coagulating solvent. The pH is preferably not more than 5.0, more preferably not more than 4.0, even more preferably not more than 3.0, and particularly preferably not more than 2.0. The lower limit of the pH is not particularly limited, and the pH is preferably not less than 0.0.

An amount of the coagulating solvent to be used is not particularly limited, and may be appropriately adjusted. For example, the amount may be adjusted to not less than 0.001 times by volume and not more than 100 times by volume relative to the cellulose dispersion. The amount may be adjusted to not less than 0.01 times by volume and not more than 10 times by volume relative to the emulsion. When the amount is within the above-described range, porous cellulose beads can be efficiently produced and desirable pores and surface pores can be efficiently formed. An amount of the coagulating solvent to be used relative to the emulsion is more preferably not less than 0.025 times by volume, even more preferably not less than 0.05 times by volume, particularly preferably not less than 0.07 times by volume, and more preferably not more than 0.4 times by volume, even more preferably not more than 0.2 times by volume, particularly preferably not more than 0.15 times by volume. The above amount to be used is considerably small in comparison with a usual amount of a coagulating solvent. However, the present inventors surprisingly found that even when an amount of the coagulating solvent to be used is decreased, porous cellulose beads can be efficiently obtained according to the present invention method.

A temperature of the coagulating solvent is not particularly limited, but it is preferred that the temperature is adjusted so that the cellulose dispersion is not frozen since when the cellulose dispersion is frozen in the coagulating solvent and then melted, cellulose beads may become deformed or cellulose may be crushed. In addition, a temperature of the coagulating solvent is preferably not less than a temperature of the cellulose dispersion. In general, a temperature of the coagulating solvent is adjusted to less than a temperature the cellulose dispersion in order to increase a coagulating speed. On the other hand, the present inventors surprisingly found that coagulation progresses at a faster rate by adjusting a temperature of the coagulating solvent to not less than a temperature of the cellulose dispersion. A specific temperature of the coagulating solvent is not particularly limited, and is preferably not less than 0° C. and not more than 150° C., more preferably not less than 25° C. and not more than 100° C., and even more preferably not less than 45° C. and not more than 80° C. However, it is preferred to appropriately adjust the temperature in consideration of a boiling temperature of the coagulating solvent or the like. In the present invention, a temperature of the cellulose dispersion means a temperature of the emulsion when the emulsion is used.

A method for contacting the cellulose dispersion or the emulsion with the coagulating solvent is not particularly limited, and a publicly-known coagulating method such as vapor-phase method can be applied. As a vapor-phase method, an oscillation method described in Example 1 of the Patent Document 2 is exemplified.

It is preferred that the cellulose dispersion or the emulsion is brought into contact with the coagulating solvent with stirring from the viewpoint of sphericity of the obtained beads. For example, the coagulating solvent may be added to the stirred cellulose dispersion or emulsion. A condition of stirring is not particularly limited, and a Pv value, which represents power consumption per volume, of a stirring power during contact is preferably not less than 0.1 kW/m$^3$ since good sphericity and porous property may be achieved. The Pv value is more preferably not less than 1.1 kW/m$^3$, particularly preferably not less than 3.1 kW/m$^3$, and most preferably not less than 5.5 kW/m$^3$ and not more than 12 kW/m$^3$. When the Pv value is more than 12 kW/m$^3$, flowability may not be possibly stable during contact. The above-described range of a Pv value includes unconscionably large as a condition for producing porous beads from cellulose, which is a relatively soft material. In such a case of high Pv value, it is worried that beads are crushed. However, the present inventors surprisingly found that when the Pv value is rather adjusted to the above-described range, porous cellulose beads having good sphericity and porous property may be produced, and the above-described Pv value is preferably applied to the present invention.

A time required for adding the coagulating solvent to the cellulose dispersion or the emulsion is not particularly limited and may be appropriately adjusted, and is preferably not more than 150 seconds. When the time is adjusted to not more than 150 seconds, strength of the obtained porous cellulose beads is surprisingly increased for reasons that are unknown. As a result, a column packed with such porous cellulose beads hardly generates critical compression of the beads even under the condition of high linear flow velocity. The time is preferably not more than 60 seconds, even more preferably not more than 40 seconds, and particularly preferably not more than 2 seconds. On the other hand, the time is excessively shorten, cellulose may be locally porous in some cased; therefore, the time is preferably not less than 0.1 seconds. In the present invention, a time required for adding the coagulating solvent to the cellulose dispersion or the emulsion means a time from a start to a completion of addition of the coagulating solvent.

(4) Step for Crosslinking

Strength of porous cellulose beads obtained by the above-described method can be further improved by using a crosslinking agent. Crosslinked porous cellulose beads are especially excellent in strength; therefore, such porous cellulose beads withstand the use under high linear velocity and high pressure. The present step may be optionally carried out.

A method for crosslinking is not particularly limited, and a publicly-known method may be applied. A crosslinking agent and crosslinking reaction condition are not also particularly limited, and publicly-known art may be applied. A crosslinking agent is exemplified by a halohydrin such as epichlorohydrin, epibromohydrin and dichlorohydrin; a bisfunctional bisepoxide (bisoxirane); and polyfunctional polyepoxide (polyoxirane). In particular, a method described in JP 2008-279366 A is preferably applied. The present inventors developed a method described in JP 2008-279366 A and found that strength of porous cellulose beads can be further improved by fractionally adding the alkaline aqueous solution for accelerating a crosslinking reaction. Such a crosslinking method can be applied to the present invention most preferably. The content of the above publication is incorporated by reference.

Stirring operation is preferably carried out in the step for preparing the cellulose dispersion, the step for preparing the emulsion and the step for coagulating. It is preferred to use a stirring blade of which shearing force is powerful, such as a paddle blade and a turbine blade, during a stirring operation in at least one of the above steps. It is more preferred to use the blade in the step for preparing the emulsion and the step for coagulating, and most preferred to use the blade in the step for coagulating. In general, the above blade is not used in a step for coagulating based on common sense, since when a blade of which shearing force is powerful is used, porous beads composed of cellulose, which is relatively soft material, may be possibly crushed. The present inventors surprisingly found that when a blade of which shearing force is powerful is used, porous cellulose beads having good sphericity and porous property may be produced for reasons that are unknown. The present inventors also found that good porous cellulose beads can be surprisingly produced in combination such a blade and the above-described Pv value, which is incomprehensible under normal circumstances. A blade of which shearing force is powerful and which is used in the present invention is not particularly limited, and a paddle blade and a turbine blade can be used. In particular, a pitched paddle blade and a rushton turbine blade are preferably used. It is also preferred to use two or more blades or two or more kinds of blades in combination. It is also preferred that two or more pitched blades are differently used in one vessel. For example, a mixture is forked on the downside of a vessel and turned down on the upper side. It is regarded as preferred that a large-size blade is generally used in a step for preparing an emulsion for homogeneous dispersion and narrower particle size distribution. On the other hand, the present inventors surprisingly found that a small-size blade such as a paddle blade and a turbine blade is preferred, since when such a blade is used, a particle size distribution of the obtained porous cellulose beads becomes narrower and sphericity thereof becomes higher.

With respect to the porous cellulose beads produced by the present invention method, coloration is prevented and mechanical strength is high. Therefore, a specific protein can be immobilized on the porous cellulose beads in order to be used as a blood contact material.

According to the present invention, the high quality porous cellulose beads described as the above can be easily produced without using an auxiliary material which is highly toxic and corrosive and without a cumbersome step which is not suitable for an industrial production. In addition, sphericity of the porous cellulose beads can be improved and porosity can be adjusted by arranging a production condition.

The present application claims the benefit of the priority date of Japanese patent application No. 2011-050714 filed on Mar. 8, 2011, and all of the contents of the Japanese patent application No. 2011-050714 filed on Mar. 8, 2011, are incorporated by reference.

EXAMPLES

Hereinafter, the present invention is described with Examples; however, the present invention is not limited to the Examples.

First, methods for evaluating physical properties of the produced porous cellulose beads are described.

Test Example 1

Measurement of Surface Pore Diameter

The porous cellulose beads obtained in each Examples were washed using 30% ethanol having an amount of 5 times by volume, and the liquid part contained in the porous cellulose beads was substituted by 30% ethanol. Next, the porous cellulose beads were similarly treated to substitute the liquid part thereof with ethanol by using 50% ethanol, 70% ethanol, 90% ethanol, special grade ethanol, special grade ethanol and special grade ethanol in order. Further, the porous cellulose beads were similarly treated using a mixed solvent of t-butyl alcohol/ethanol=3/7. Then, the porous cellulose beads were similarly treated to substitute the liquid part thereof with t-butyl alcohol by using mixed solvents of t-butyl alcohol/ethanol=5/5, 7/7, 9/1, 10/0, 10/0 and 10/0. The porous cellulose beads were freeze-dried. Vapor deposition process was carried out on the freeze-dried porous cellulose beads to photograph SEM images of 25,000 times. The diameters of surface pores were measured from the photographed SEM images using ImageJ, which is a software developed at the National Institutes of Health in the United States.

Test Example 2

Measurement of Maximum Pore Diameter (1) Packing in Column

The porous cellulose beads were dispersed in RO water, and the mixture was degassed. A column (Tricorn 10/300, manufactured by GE Healthcare Japan Corporation) was packed with the degassed porous particle mixture at a linear velocity of 105 cm/h. Next, an eluent (129 mL) of which pH was 7.5 was passed through the column at a linear velocity of 26 cm/h.

(2) Addition of Marker

The following markers were used.

Blue Dextran 2000, manufactured by Pharmacia FIne Chemicals Co., Ltd.

Low Density Lipoprotein, manufactured by SIGMA Co., MW 3,000,000

Thyroglobulin, manufactured by SIGMA Co., MW 660,000

Ferritin, manufactured by SIGMA Co., MW 440,000

Aldolase, manufactured by SIGMA Co., MW 158,000

IgG derived from human, manufactured by SIGMA Co., MW 115,000 (not used in Reference Example 1)

Bovine Serum Albumin, manufactured by Wako Co., Ltd., MW 6,700

Cytochrome C, manufactured by Wako Co., MW 12,400

Bacitracin, manufactured by Wako Co., Ltd., MW 1,400

The above markers were diluted with buffer of pH 7.5 to adjust the concentration to be 5 mg/mL. While the above eluent was passed through the column at a linear velocity of 26 cm/h, 12 μL of each diluted solution was injected. The concentrations of the markers were finely tuned as necessary.

(3) Measurement

As measurement device, DGU-20A3, SCL-10A, SPD-10A, LC-10AD, SIL-20AC and CTO-10AC, which were respectively manufactured by SHIMADZU Corp., were used, and LCSolution was used as a software for measurement. For measuring an amount of liquid, 50 mL graduated cylinder was used.

At the same time as the injection of the marker, observation by UV monitor and measurement of eluent amount were started, and 1) an eluent amount corresponding to the first peak of Blue Dextran was measured as $V_0$ mL;
2) eluent amounts corresponding to the peaks of each markers were measured as $V_R$ mL;
3) a total volume of porous particles in the column was regarded as $V_t$ mL.

(4) Calculation

The value of $K_{av}$: gel phase distribution coefficients of each markers was calculated in accordance with the following formula.

$$K_{av} = (V_R - V_0)/(V_t - V_0)$$

(5) Calculation of Maximum Pore Diameter

The value of $K_{av}$ and logarithm of molecular weight of each markers were plotted, and the slope and y-intercept of the following formula were obtained from the part which exhibited linearity.

$$K_{av} = k \times L_n(\text{molecular weight}) + b$$

Then, the molecular weight when $K_{av}$ is 0, i.e. exclusion limit molecular weight, was obtained from the above slope and intercept. Next, the exclusion limit molecular weight was substituted in the following correlation formula of diameter and molecular weight of globular protein in a neutral buffer solution, and the value was obtained as the maximum diameter of the pores of the sample particle.

Diameter of globular protein in a neutral buffer solution(Å)=2.523×(molecular weight)$^{0.3267}$ Test Example 3

Calculation of Average Pore Diameter

The molecular weight corresponding to the value of the maximum $K_{av}/2$ in the part which exhibited linearity in the Test Example 2(2) was substituted in the above-described correlation formula of diameter and molecular weight of globular protein in a neutral buffer solution, and the value was obtained as an average pore diameter of the porous cellulose beads.

When $K_{av}$ of adsorbent for a target substance to be adsorbed was measured in the Test Example 2 and Test Example 3, the target substance could be adsorbed and an accurate measurement might be impossible. Therefore, the value of $K_{av}$ of adsorbent for the target substance to be adsorbed was obtained by measuring the values of $K_{av}$ of two or more proteins which had molecular weight close to the molecular weight of the target substance and then calculating from the measured data. For example, when the target substance to be adsorbed is IgG, the value of $K_{av}$ was obtained from the data of ferritin and albumin.

Test Example 4

Measurement of Median Particle Diameter

Particle size distribution of the porous cellulose beads on the basis of volume was measured using a laser diffraction/scattering type particle size distribution measuring apparatus (LA-950, manufactured by HORIBA Ltd.), and median particle diameter was obtained.

Test Example 5

Evaluation of Strength

AKTAexplorer 10S (manufactured by GE Healthcare Bio-Sciences Corp.) was used, and a mesh of 22 μm was attached to a column having a diameter of 0.5 cm and height of 15 cm. Into the column, 3 mL of the porous cellulose beads were respectively charged, and 20% ethanol aqueous solution (prepared from ethanol manufactured by Wako Pure Chemical Industries, Ltd. and distilled water) was passed at a linear velocity of 450 cm/h for 1 hour. Next, a phosphate buffer of pH 7.4 (manufactured by SIGMA Co.) was passed through the column at various linear velocities to specify the linear velocity at which critical compression was observed for strength evaluation.

Example 1

(1) Preparation of Alkaline Aqueous Solution A

Sodium hydroxide manufactured by Wako Pure Chemical Industries, Ltd. and distilled water were used to prepare 9 wt % sodium hydroxide aqueous solution, and the temperature of the solution was adjusted to 4° C.

(2) Preparation of Cellulose Dispersion A

The above alkaline aqueous solution A of which temperature was adjusted to 4° C. was stirred with maintaining the temperature at 4° C., and then microcrystalline cellulose of which median particle diameter was 71 μm (manufactured by Johnson Matthey Co.) which had been still stood at 4° C. for 2 hours was added thereto little by little until the concentration of cellulose became 5 wt %. The mixture was stirred with maintaining the temperature at 4° C. for 2 hours after the addition, to prepare a cellulose dispersion in which cellulose was homogeneously dispersed and swelled. The dispersion was preserved at 4° C. The photograph of the obtained cellulose dispersion is shown as FIG. 1(1).

(3) Preparation of Porous Cellulose Beads

Medium chain fatty acid triglyceride (Actor-M-2, manufactured by Riken Vitamin Co., Ltd., 85 mL) was stirred at 300 rpm and at 4° C., and 15 mL of the cellulose dispersion A was added thereto. The mixture was stirred at 300 rpm and at 4° C. for 15 minutes. The obtained dispersion was added to 300 mL of 90% methanol of which temperature was adjusted to 50° C. and which was stirred at 300 rpm, and the mixture was stirred at 300 rpm and at 50° C. for 10 minutes. After suction filtration was carried out, washing was carried out using 75 mL of ethanol and subsequently 150 mL of water to obtain porous cellulose beads. The median diameter of surface pore of the obtained porous cellulose beads was 747 Å. In the past, it was thought that a cellulose dispersion in which cellulose was not dissolved could not be used for producing porous cellulose beads. However, as just described, porous cellulose beads having good properties could be produced from a cellulose dispersion.

Example 2

Porous cellulose beads were obtained in a similar condition to the Example 1 except that 1.2 M citric acid aqueous solution which was prepared from citric acid monohydrate manufactured by Wako Pure Chemical Industries, Ltd. and distilled water was used as a coagulating solvent and the temperature of the coagulating solvent was adjusted to 75° C. The median diameter of surface pore diameter of the obtained porous cellulose beads was 1057 Å.

Example 3

Porous cellulose beads were obtained in a similar condition to the Example 1 except that a solution prepared by mixing methanol and 1.2 M citric acid aqueous solution in a ratio of 9:1 was used as a coagulating solvent. The median diameter of surface pore of the obtained porous cellulose beads was 932 Å.

Example 4

Porous cellulose beads were obtained in a similar condition to the Example 1 except that a solution prepared by mixing methanol and sulfuric acid manufactured by Wako Pure Chemical Industries, Ltd. in a ratio of 8:2 was used as a coagulating solvent. The median diameter of surface pore diameter of the obtained porous cellulose beads was 1298 Å.

Example 5

(1) Preparation of Cellulose Dispersion B

Cellulose dispersion B was prepared in a similar condition to the case of cellulose dispersion A of Example 1(2) except that the concentration of cellulose was adjusted to 6 wt %.

(2) Preparation of Porous Cellulose Beads

To 82 mL of o-dichlorobenzene (manufactured by Wako Pure Chemical Industries, Ltd.), 1.15 g of sorbitan monooleate (manufactured by Wako Pure Chemical Industries, Ltd., corresponding to span 80) was added. The mixture was stirred at 4° C. and at 330 rpm. To the stirred mixture, 18 mL of cellulose dispersion B was added. The mixture was stirred at 4° C. and at 330 rpm for 15 minutes. The obtained emulsion was added to 300 mL of methanol which was stirred at 300 rpm and at 55° C. The mixture was stirred at 300 rpm and at 55° C. for 10 minutes for coagulation. After suction filtration was carried out, washing was carried out using 75 mL of methanol and subsequently 150 mL of water to obtain porous cellulose beads. The median diameter of surface pore diameter of the obtained porous cellulose beads was 667 Å.

Example 6

Porous cellulose beads were obtained in a similar condition to the Example 5 except that ethanol was used as a coagulating solvent. The median diameter of surface pore diameter of the obtained porous cellulose beads was 453 Å.

Comparative Example 1

(1) Preparation of Cellulose Solution

The alkaline aqueous solution A of the Example 1(1) of which temperature was adjusted to 4° C. was stirred with maintaining the temperature at 4° C., and then microcrystalline cellulose of which median particle diameter was 71 µm (manufactured by Johnson Matthey Co.) which had been still stood at 4° C. for 2 hours was added thereto little by little until the concentration of cellulose became 9 wt %. The mixture was stirred with maintaining the temperature at 4° C. for 2 hours after the addition so that cellulose was homogeneously dispersed and swelled. The mixture was completely frozen at −20° C. Then, the frozen mixture was melted at 4° C., and diluted with distilled water so that the volume became 1.5 times. The mixture was stirred for homogenization and preserved at 4° C. The photograph of the obtained cellulose solution is shown as FIG. 1(2).

(2) Preparation of Porous Cellulose Beads

Porous cellulose beads were obtained in a similar condition to the Example 6 except that the above cellulose solution was used instead of cellulose dispersion B. The median diameter of surface pore diameter of the obtained porous cellulose beads was 502 Å.

Comparative Example 2

Porous cellulose beads were obtained in a similar condition to the Example 5 except that the cellulose solution of the Comparative Example 1(1) was used, 60% methanol at 4° C. was used as a coagulating solvent instead of methanol at 55° C., and the temperature of the coagulating solvent was adjusted to 4° C. The median diameter of surface pore diameter of the obtained porous cellulose beads was 451 Å.

Comparative Example 3

Porous cellulose beads were obtained in a similar condition to the Comparative Example 2 except that the amount of the coagulating solvent was 5.4 mL and methanol was used as the coagulating solvent. The median diameter of surface pore diameter of the obtained porous cellulose beads was 531 Å.

As the Comparative Examples 1 to 3, when a cellulose solution was prepared by freezing a cellulose dispersion and then melting the frozen dispersion, and the cellulose solution was brought into contact with a coagulating solvent, porous cellulose beads could be obtained. However, such a method is not suitable for industrial mass production, since the method requires energy and time to freeze a dispersion and melt the frozen dispersion. On the other hand, according to the present invention method, similar porous cellulose beads can be produced without the steps for freezing and melting.

Example 7

Porous cellulose beads were obtained in a similar condition to the Example 5 except that the temperature when the emulsion was prepared was adjusted to 55° C. and an amount of the coagulating solvent was 7.2 mL.

Example 8

Porous cellulose beads were obtained in a similar condition to the Example 7 except that 60% methanol was used as a coagulating solvent.

Example 9

Porous cellulose beads were obtained in a similar condition to the Example 7 except that distilled water was used as a coagulating solvent.

Example 10

Porous cellulose beads were obtained in a similar condition to the Example 7 except that ethanol was used as a coagulating solvent.

Example 11

(1) Preparation of Alkaline Aqueous Solution B

Sodium hydroxide manufactured by Wako Pure Chemical Industries, Ltd. and distilled water were used to prepare 33 wt % sodium hydroxide aqueous solution, and the temperature of the solution was adjusted to 4° C.

(2) Preparation of Cellulose Dispersion C

Japanese Pharmacopoeia cellulose PH-F20JP, which was manufactured by Asahi Kasei Chemicals Corp. and of which median particle diameter was 21 μm, and distilled water were mixed in a ratio of 9.2 parts by weight and 104 parts by weight respectively. The temperature of the mixture was adjusted to 4° C. with stirring. To the stirred mixture, 40 parts by weight of the alkaline aqueous solution B of which temperature was adjusted to 4° C. was added. The obtained mixture was stirred at 4° C. for 30 minutes.

(3) Preparation of Porous Cellulose beads

The cellulose dispersion C, o-dichlorobenzene and sorbitan monooleate (corresponding to span 80) of which temperatures were adjusted to 4° C. were mixed in a ratio of 154 parts by weight, 776 parts by weight and 7.8 parts by weight respectively. The mixture was stirred in a separable flask equipped with two rushton turbine blades at 300 rpm (Pv value: 0.2 kW/m$^3$) at 4° C. for 30 minutes, to prepare an emulsion. To the emulsion, 57 parts by weight of methanol of which temperature was adjusted to 4° C. was added as a coagulating solvent with stirring and maintaining the temperature. The volume of the coagulating solvent was 0.1 times relative to the emulsion. The time required for adding the coagulating solvent was 2 seconds. Then, the mixture was stirred with maintaining the rotational rate for stirring and the temperature for 20 minutes. After suction filtration was carried out, washing was carried out using 240 parts by weight of ethanol and subsequently 500 parts by weight of water to obtain porous cellulose beads. The obtained cellulose beads were wet-classified using sieves of 38 μm and 90 μm.

(4) Crosslinking—Method a, for which JP 2008-279366 a was Referred

Distilled water was added to 11 parts by volume of the above porous cellulose beads so that the total volume became 16.5 parts by volume. The slurry was transferred to a reaction vessel. To the reaction vessel, 3.86 parts by volume of 4N NaOH aqueous solution which was prepared from NaOH manufactured by NACALAI TESQUE, INC. and distilled water was added. The mixture was heated up to 40° C. To the mixture, 1.77 parts by weight of a crosslinking agent (DENACOL EX-314, manufactured by Nagase ChemteX Corporation), which contained glycerol polyglycidyl ether, was added. The obtained mixture was stirred at 40° C. for 4 hours. After the reaction, the beads were washed using 20 parts by volume of distilled water with carrying out suction filtration. The obtained beads were referred to as "one-time crosslinked beads".

The obtained one-time crosslinked beads were transferred to a vessel. Distilled water was added thereto so that the total volume became 10 times by volume of the crosslinked porous beads. The mixture was heated up to 120° C. for 1 hour using an autoclave. After the mixture was cooled down to room temperature, the beads were washed using 5 times by volume of RO water, to obtain autclaved one-time crosslinked beads of which epoxy group was changed to glyceryl group.

Next, distilled water was added to 11 parts by volume of the autclaved one-time crosslinked beads so that the total volume became 16.5 parts by volume. The mixture was transferred to a reaction vessel, and 3.86 parts by volume of 4N NaOH aqueous solution which was prepared from NaOH manufactured by NACALAI TESQUE, INC. and distilled water was added thereto. The mixture was heated up to 40° C. A crosslinking agent (DENACOL EX-314, manufactured by Nagase ChemteX Corporation) of 1.77 parts by weight was added thereto. The obtained mixture was stirred at 40° C. for 4 hours. After the reaction, the beads were washed using 20 times by volume of distilled water with carrying out suction filtration. The obtained beads were referred to as "two-times crosslinked beads".

The obtained two-times crosslinked beads were transferred to a vessel. Distilled water was added thereto so that the total volume became 10 times by volume of the crosslinked porous beads. The mixture was heated up to 120° C. for 60 minutes using an autoclave. After the mixture was cooled down to room temperature, the beads were washed using 5 times by volume of distilled water, to obtain autclaved two-times crosslinked beads.

(5) Physical Property Test

The median particle diameter of the above crosslinked beads was 75 μm. Further, the average pore diameter was 215 Å, maximum pore diameter was 1756 Å, and exclusion limit molecular weight was $5.0 \times 10^8$.

Example 12

Crosslinked porous cellulose beads were obtained in a similar condition to the Example 11 except that 15 wt % methanol solution of citric acid monohydrate was used as a coagulating solvent. The median particle diameter of the above crosslinked beads was 75 μm, the average pore diameter was 190 Å, maximum pore diameter was 718 Å, and exclusion limit molecular weight was $3.2 \times 10^7$.

Example 13

(1) Preparation of Porous Cellulose Beads

Porous cellulose beads were obtained in a similar condition to the Example 11 except that rotational rate was 500 rpm (Pv value: 1.1 kW/m$^3$) and a sieve of 63 μm was used instead of the sieve of 90 μm.

(2) Crosslinking—Method B

Distilled water was added to 20 parts by volume of the above porous cellulose beads so that the total volume was 30 parts by volume. The mixture was transferred to a reaction vessel. To the mixture, 2.3 parts by weight of a crosslinking agent (DENACOL EX-314, manufactured by Nagase ChemteX Corporation), which contained glycerol polyglycidyl ether, was added. The mixture was stirred with heating up to 40° C. After the temperature became 40° C., the mixture was stirred for 30 minutes. Separately, 7.1 parts by volume of 2N NaOH aqueous solution was prepared from NaOH manufactured by NACALAI TESQUE, INC. and distilled water. The NaOH aqueous solution was added to the above mixture in increments of one quarter per one hour. During the addition, the temperature was maintained at 40° C. and stirring was maintained. After final amount of one quarter was added, the mixture was stirred at the same temperature for 1 hour. After the reaction, the beads were washed using 20 times by volume of distilled water with carrying out suction filtration. The obtained beads were referred to as "one-time crosslinked beads".

The obtained one-time crosslinked beads were transferred to a vessel. Distilled water was added thereto so that the total volume became 10 times by volume of the crosslinked porous beads. The mixture was heated up to 120° C. for 1 hour using an autoclave. After the mixture was cooled down to room temperature, the beads were washed using 5 times by volume of RO water, to obtain autclaved one-time crosslinked beads of which epoxy group was changed to glyceryl group.

Next, distilled water was added to 20 parts by volume of the autclaved one-time crosslinked beads so that the total volume became 30 parts by volume. The mixture was transferred to a reaction vessel, and 2.3 parts by weight of a crosslinking agent (DENACOL EX-314, manufactured by Nagase ChemteX Corporation), which contained glycerol polyglycidyl ether, was added thereto. The mixture was heated up to 40° C. with stirring. After the temperature became 40° C., the mixture was stirred for 30 minutes. Separately, 7.1 parts by volume of 2N NaOH aqueous solution was prepared from NaOH manufactured by NACALAI TESQUE, INC. and distilled water. The NaOH aqueous solution was added to the above mixture in increments of one quarter per one hour. During the addition, the temperature was maintained at 40° C. and stirring was maintained. After final amount of one quarter was added, the mixture was stirred at the same temperature for 1 hour. After the reaction, the beads were washed using 20 times by volume of distilled water with carrying out suction filtration. The obtained beads were referred to as "two-times crosslinked beads".

The obtained two-times crosslinked beads were transferred to a vessel. Distilled water was added thereto so that the total volume became 10 times by volume of the crosslinked porous beads. The mixture was heated up to 120° C. for 60 minutes using an autoclave. After the mixture cooled down to room temperature, the beads were washed using 5 times by volume of distilled water, to obtain autclaved two-times crosslinked beads.

(3) Physical Property Test

The median particle diameter of the above crosslinked beads was 56 µm. Further, the average pore diameter was 336 Å, maximum pore diameter was 3400 Å, and exclusion limit molecular weight was $3.8 \times 10^9$. The beads were not critically compressed even at a linear velocity of 3057 cm/h.

Example 14

Crosslinked porous cellulose beads were obtained in a similar condition to the Example 11 except that 15 wt % ethanol solution of citric acid monohydrate was used as a coagulating solvent. The median particle diameter of the obtained crosslinked beads was 75 µm, the average pore diameter was 163 Å, maximum pore diameter was 1040 Å, and exclusion limit molecular weight was $1.0 \times 10^8$.

Example 15

Crosslinked porous cellulose beads were obtained in a similar condition to the Example 11 except that an amount of the coagulating solvent was 28 parts by weight. The median particle diameter of the obtained crosslinked beads was 75 µm, the average pore diameter was 232 Å, maximum pore diameter was 1419 Å, and exclusion limit molecular weight was $2.6 \times 10^8$.

Example 16

Crosslinked porous cellulose beads were obtained in a similar condition to the Example 13 except that a sieve of 90 µm was used instead of the sieve of 63 µm. The median particle diameter of the obtained crosslinked beads was 75 µm. The beads were not critically compressed even at a linear velocity of 3057 cm/h, which is the maximum linear velocity of a passing liquid in the used device.

Example 17

Crosslinked porous cellulose beads were obtained in a similar condition to the Example 16 except that a rotational ratio for stirring was 700 rpm (Pv value: 3.1 kW/m$^3$). Median particle diameter of the obtained crosslinked beads was 75 µm. The beads were not critically compressed even at a linear velocity of 3057 cm/h.

Example 18

Crosslinked porous cellulose beads were obtained in a similar condition to the Example 16 except that a rotational ratio for stirring was 250 rpm (Pv value: 0.1 kW/m$^3$). The median particle diameter of the obtained crosslinked beads was 75 µm, the average pore diameter was 130 Å, maximum pore diameter was 562 Å, and exclusion limit molecular weight was $1.5 \times 10^7$.

Example 19

Crosslinked porous cellulose beads were obtained in a similar condition to the Example 16 except that one WH type large-size blade was used as a stirring blade and a rotational ratio for stirring was 350 rpm (Pv value: 1.1 kW/m$^3$). The particle size distribution immediately after the agglomeration was broader than the case of the Example 16.

Example 20

Crosslinked porous cellulose beads were obtained in a similar condition to the Example 16 except that a time required for adding a coagulating solvent was 60 seconds. The median particle diameter of the obtained crosslinked beads was 75 µm.

Example 21

Crosslinked porous cellulose beads were obtained in a similar condition to the Example 16 except that a time required for adding a coagulating solvent was 160 seconds. The median particle diameter of the obtained crosslinked beads was 75 μm. The beads were critically compressed at a linear velocity of 1987 cm/h. In addition, the beads were slightly difficult to be packed, and a protein was eluted relatively earlier.

Example 22

Crosslinked porous cellulose beads were obtained in a similar condition to the Example 17 except that two pitched paddle blades were used as blades for stirring.

Example 23

Crosslinked porous cellulose beads were obtained in a similar condition to the Example 22 except that the temperature for production was adjusted to 9° C.

Example 24

Crosslinked porous cellulose beads were obtained in a similar condition to the Example 22 except that the temperature for production was adjusted to 0° C.

Example 25

Crosslinked porous cellulose beads were obtained in a similar condition to the Example 16 except that a time required for adding a coagulating solvent was 10 seconds.

Example 26

Crosslinked porous cellulose beads were obtained in a similar condition to the Example 16 except that a time required for adding a coagulating solvent was 30 seconds.

Example 27

Crosslinked porous cellulose beads were obtained in a similar condition to the Example 16 except that a rotational ratio for stirring was 1180 rpm (Pv value: 12 kW/m$^3$).

Example 28

Crosslinked porous cellulose beads were obtained in a similar condition to the Example 16 except that a rotational ratio for stirring was 800 rpm (Pv value: 5.5 kW/m$^3$).

Example 29

Crosslinked porous cellulose beads were obtained in a similar condition to the Example 16 except that a stirring time for preparing a dispersion was changed from 30 minutes to 120 minutes.

Example 30

(1) Preparation of Cellulose Dispersion D

Cellulose dispersion D was prepared in a similar condition to the case of cellulose dispersion C in the Example 11(2) except that officinal cellulose KG-1000, which was manufactured by Asahi Kasei Chemicals Corp. and of which median particle diameter was 54 μm, was used.

(2) Preparation of Porous Cellulose Beads

Crosslinked porous cellulose beads were obtained in a similar condition to the Example 27 except that the above cellulose dispersion D was used.

Example 31

Crosslinked porous cellulose beads were obtained in a similar condition to the Example 27 except that the above cellulose dispersion D was used.

Example 31

Crosslinked porous cellulose beads were obtained in a similar condition to the Example 30 except that an amount of the coagulating solvent was 228 parts by weight.

Comparative Example 4

Sodium hydroxide manufactured by Wako Pure Chemical Industries, Ltd. and distilled water were used to prepare 9 wt % sodium hydroxide aqueous solution. The temperature of the aqueous solution was adjusted to 25° C. Separately, microcrystalline cellulose (manufactured by Johnson Matthey Co.) was stood still at 25° C. for 2 hours. The sodium hydroxide aqueous solution of 25° C. was stirred with maintaining the temperature. The microcrystalline cellulose was added to the stirred sodium hydroxide aqueous solution little by little until the concentration of cellulose became 5 wt %. After the addition, the mixture was stirred with maintaining the temperature of 25° C. for 2 hours. The mixture was preserved at 25° C.; as a result, cellulose particles were settled out and a cellulose dispersion could not be obtained. In addition, the mixture was stained yellow.

Comparative Example 5

(1) Preparation of Cellulose Solution

To 100 g of 60 wt % calcium thiocyanate aqueous solution, 6.4 g of crystalline cellulose (CEOLUS PH101, manufactured by Asahi Kasei Chemicals Corporation, median particle diameter: 73 μm) was added. The mixture was heated up to 120° C. to dissolve cellulose. The solution was used shortly after the preparation, since it is difficult to preserve the solution at 120° C.

(2) Preparation of Crosslinked Porous Cellulose Beads

Porous cellulose beads were prepared using calcium thiocyanate with reference to the Examples described in WO2010/095573 as follows. Specifically, 6 g of sorbitan monooleate was added as surfactant to the above cellulose solution, and the mixture was added dropwise to 480 mL of o-dichlorobenzene which was preliminarily heated up to 140° C. The mixture was stirred at 300 rpm. Next, the above dispersion was cooled down to 40° C., and poured into 190 mL of methanol to coagulate cellulose. After suction filtration was carried out, washing was carried out using 190 mL of methanol. The washing with methanol was repeated several times. After washing was further carried out using a large amount of distilled water, suction filtration was carried out to obtain porous cellulose beads. Porous cellulose beads were filtered, and 100 g of the beads were added to a solution prepared by dissolving 60 g of sodium sulfate in 121 g of distilled water. The mixture was stirred at 50° C. for 2 hours. Then, 3.3 g of 45 wt % sodium hydroxide aqueous solution and 0.5 g of sodium borohydride were added thereto, and the mixture was stirred. To the stirred mixture at 50° C., 48 g of 45 wt % sodium hydroxide aqueous solution and 50 g of epichlorohydrin were added in increments of 25 equal parts respectively every 15 minutes. After the addition, the reaction was carried out at 50° C. for 16 hours. After the reaction, the mixture was cooled down to 40° C., and neutralized by adding 2.6 g of acetic acid. Suction filtration was carried out and washing was carried out using distilled water. Wet classification was carried out using sieves of 53 μm and 90 μm to obtain crosslinked porous cellulose beads having average particle diameter of 78 μm.

(3) Physical Property Test

The surface pore diameter of the above crosslinked porous cellulose beads was 1649 Å, the average pore diameter was 793 Å, maximum pore diameter was 14100 Å, and exclusion limit molecular weight was $2.9 \times 10^{11}$. The beads were not critically compressed even at a linear velocity of 3057 cm/h.

As the above, the crosslinked porous cellulose beads obtained in the Comparative Example 5 had considerably too large pores. In addition, the solution containing calcium thiocyanate, which is highly toxic, remained as a waste liquid.

Reference Example 1

The average porous diameter of commercially available porous agarose beads (MabSelect SuRe LX, manufactured by GE Healthcare Corp.), of which amount of monoclonal antibody to be adsorbed was relatively large and in which Protein A was introduced, was 425 Å. The maximum pore diameter thereof was 2970 Å, and the exclusion limit molecular weight thereof was $2.5 \times 10^{9}$.

The invention claimed is:

1. A method for producing porous cellulose beads, comprising the steps of:
mixing a cold alkaline aqueous solution and cellulose to prepare a cellulose dispersion; wherein the cellulose concentration in the cellulose dispersion is not less than 1 wt % and not more than 10 wt %, and the temperature of the cold alkaline aqueous solution is not more than 15° C.; and bringing the cellulose dispersion into contact with a coagulating solvent.

2. The method for producing porous cellulose beads according to claim 1, wherein an alkali concentration in the alkaline aqueous solution is not less than 5 wt % and not more than 15 wt %.

3. The method for producing porous cellulose beads according to claim 1, wherein a median particle diameter of the cellulose is not less than 10 μm and not more than 500 μm.

4. The method for producing porous cellulose beads according to claim 1, wherein the coagulating solvent contains an alcohol.

5. The method for producing porous cellulose beads according to claim 1, wherein the coagulating solvent is acidified.

6. The method for producing porous cellulose beads according to claim 1, wherein a temperature for preparing and preserving the cellulose dispersion is not less than −20° C. and not more than 10° C.

7. The method for producing porous cellulose beads according to claim 1, wherein the cellulose dispersion is dispersed in a continuous phase to obtain an emulsion, and then the emulsion is brought into contact with the coagulating solvent.

8. The method for producing porous cellulose beads according to claim 7, wherein the coagulating solvent has not less than 0.01 times and not more than 1 time as much volume as the emulsion.

9. The method for producing porous cellulose beads according to claim 7, wherein a value of Pv at the time of preparing the emulsion is not less than 0.1 kW/m$^3$, and the value of Pv represents power consumption per volume.

10. The method for producing porous cellulose beads according to claim 1, wherein a value of Pv at the time of bringing the cellulose dispersion into contact with the coagulating solvent is not less than 0.1 kW/m$^3$, and the value of Pv represents power consumption per volume.

11. The method for producing porous cellulose beads according to claim 7, wherein a time required for adding the coagulating solvent to the emulsion is not more than 150 seconds.

12. The method for producing porous cellulose beads according to claim 1, wherein the cellulose dispersion is prepared by preparing a preliminary dispersion from water and cellulose and mixing the preliminary dispersion with the alkaline aqueous solution.

13. The method for producing porous cellulose beads according to claim 1, wherein a stirring operation in at least one step is carried out using a turbine blade.

14. The method for producing porous cellulose beads according to claim 2, wherein a median particle diameter of the cellulose is not less than 10 μm and not more than 500 μm.

15. The method for producing porous cellulose beads according to claim 2, wherein the coagulating solvent contains an alcohol.

16. The method for producing porous cellulose beads according to claim 3, wherein the coagulating solvent contains an alcohol.

17. A method for producing crosslinked porous cellulose beads, comprising the steps of:
mixing a cold alkaline aqueous solution and cellulose to prepare a cellulose dispersion; wherein the cellulose concentration in the cellulose dispersion is not less than 1 wt % and not more than 10 wt %, and the temperature of the cold alkaline aqueous solution is not more than 15° C.; bringing the cellulose dispersion into contact with a coagulating solvent thereby obtaining porous cellulose beads; and the further step of crosslinking the porous cellulose beads.

* * * * *